United States Patent
Liu et al.

(10) Patent No.: US 9,857,902 B2
(45) Date of Patent: Jan. 2, 2018

(54) EMBEDDED TOUCH SCREEN DISPLAY PANEL DRIVING MECHANISM

(71) Applicant: HON HAI PRECISION INDUSTRY CO., LTD., New Taipei (TW)

(72) Inventors: Feng-Hsiang Liu, Tu-Cheng (TW); Chia-Lin Liu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 99 days.

(21) Appl. No.: 14/944,410

(22) Filed: Nov. 18, 2015

(65) Prior Publication Data

US 2016/0147348 A1    May 26, 2016

(30) Foreign Application Priority Data

Nov. 21, 2014 (TW) .............................. 103140377 A

(51) Int. Cl.
G06F 3/041 (2006.01)
(52) U.S. Cl.
CPC .......... G06F 3/0412 (2013.01); G06F 3/0416 (2013.01)
(58) Field of Classification Search
CPC ........................... G06F 3/0412; G09G 3/3655
See application file for complete search history.

(56) References Cited

U.S. PATENT DOCUMENTS

| 9,164,641 | B1* | 10/2015 | Rowe | G06F 3/044 |
| 2008/0062148 | A1* | 3/2008 | Hotelling | G02F 1/13338 |
| | | | | 345/174 |
| 2009/0256818 | A1* | 10/2009 | Noguchi | G02F 1/13338 |
| | | | | 345/174 |
| 2010/0295804 | A1* | 11/2010 | Takeuchi | G02F 1/13338 |
| | | | | 345/173 |
| 2010/0328256 | A1* | 12/2010 | Harada | G06F 3/044 |
| | | | | 345/174 |
| 2011/0267295 | A1* | 11/2011 | Noguchi | G06F 3/0416 |
| | | | | 345/173 |
| 2012/0044166 | A1* | 2/2012 | Mizuhashi | G06F 3/0412 |
| | | | | 345/173 |
| 2012/0044195 | A1* | 2/2012 | Nakanishi | G06F 3/0412 |
| | | | | 345/174 |

(Continued)

FOREIGN PATENT DOCUMENTS

| CN | 103424909 A | 12/2013 |
| TW | 201419071 | 5/2014 |

*Primary Examiner* — Dorothy Harris
(74) *Attorney, Agent, or Firm* — ScienBiziP, P.C.

(57) ABSTRACT

An embedded touch screen display panel driving mechanism includes a number of common electrodes, a number of pixel units each including a pixel electrode, and a number of touch sensing electrodes. The common electrodes can receive a first common voltage to cooperatively induce a first electric field with the pixel electrodes to drive liquid crystals of a liquid crystal layer to rotate to display according to data signals received by the pixel electrodes. The common electrodes can also receive a second common voltage to cooperatively induce a second electric field with the touch sensing electrodes to enable the touch sensing electrodes to transmit touch signals corresponding to touch input on the touch electrodes. At any one time, some common electrodes receive the first common voltage while other common electrodes receive the second common voltage.

14 Claims, 21 Drawing Sheets

(56) References Cited

U.S. PATENT DOCUMENTS

| | | | |
|---|---|---|---|
| 2012/0050217 A1* | 3/2012 | Noguchi | G06F 3/0412 345/174 |
| 2012/0068961 A1* | 3/2012 | Mizuhashi | G06F 3/0412 345/174 |
| 2013/0314343 A1 | 11/2013 | Cho et al. | |
| 2014/0049508 A1* | 2/2014 | Kim | G06F 3/044 345/174 |
| 2014/0118299 A1* | 5/2014 | Wang | G06F 3/0416 345/174 |
| 2014/0132560 A1* | 5/2014 | Huang | G06F 3/044 345/174 |
| 2015/0177881 A1* | 6/2015 | Chen | G06F 3/044 345/174 |
| 2015/0268777 A1* | 9/2015 | Okamura | G06F 3/0412 345/205 |
| 2016/0188060 A1* | 6/2016 | Liu | G06F 3/0412 345/174 |
| 2016/0283003 A1* | 9/2016 | Liu | G06F 3/0412 |

* cited by examiner

EMBEDDED TOUCH SCREEN DISPLAY PANEL DRIVING MECHANISM

FIELD

The subject matter herein generally relates to embedded touch screen display panels, and more particularly to a structure and a driving mechanism of an embedded touch screen display panel.

BACKGROUND

Generally, embedded touch screen display panels can operate in two modes. In a first operation mode, the touch screen display panel operates in a display mode to display images thereon. In a second operation mode, the touch screen display panel can receive touch input thereon. The embedded touch screen display panel may switch back and forth between the two operation modes.

BRIEF DESCRIPTION OF THE DRAWINGS

Implementations of the present technology will now be described, by way of example only, with reference to the attached figures.

DETAILED DESCRIPTION

Figure 1:
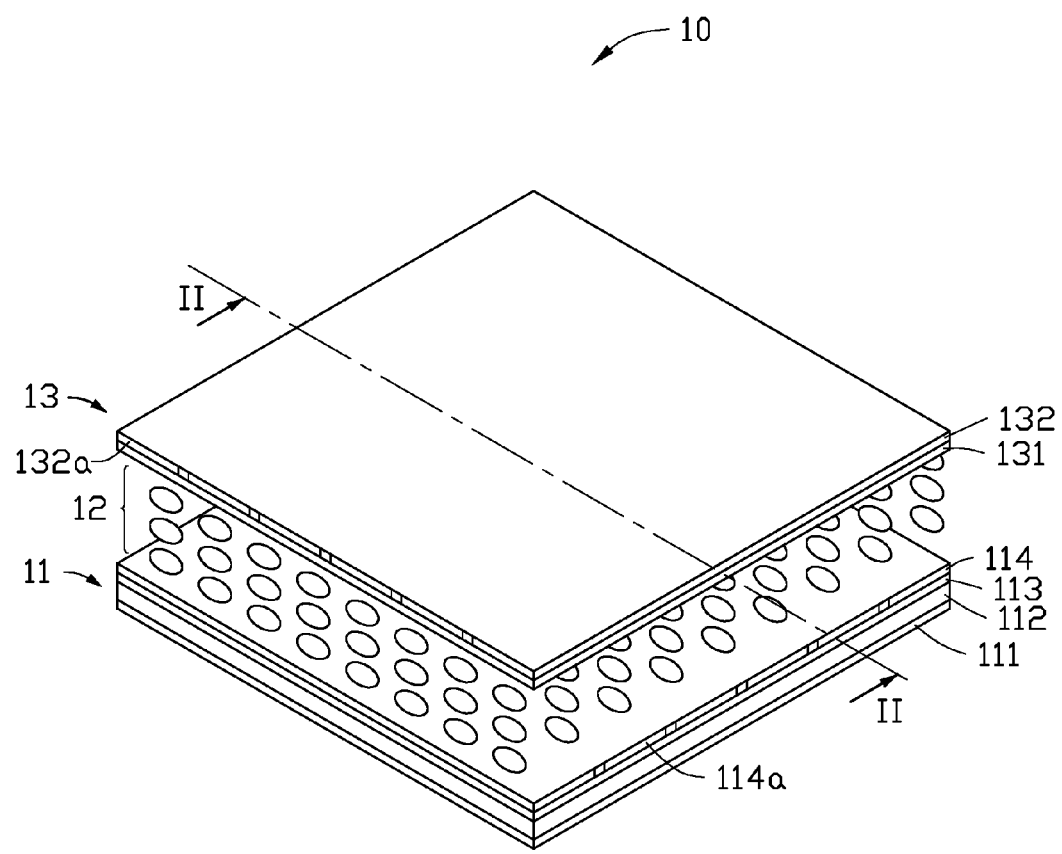
FIG. 1 is an isometric view of an embodiment of an embedded touch screen display panel.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

Figure 2:
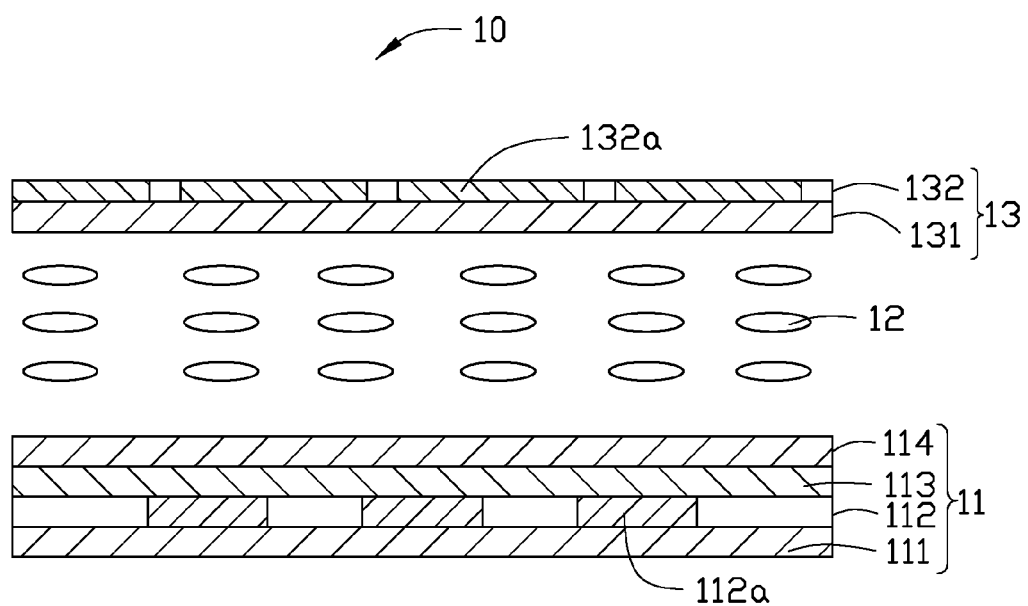
FIG. 2 is a cross-sectional view of the embedded touch screen display panel taken along line II-II of FIG. 1.

FIG. 1 and FIG. 2 illustrate an embodiment of an embedded touch screen display panel 10 (hereinafter "the display panel 10") that can display while receiving touch input. The display panel 10 can include a first substrate 11, a liquid crystal layer 12, and a second substrate 13. The liquid crystal layer 12 can be located between the first substrate 11 and the second substrate 13. In at least one embodiment, the first substrate 11 can be an array substrate, and the second substrate 13 can be a color film substrate.

The first substrate 11 can include a first base layer 111, a pixel electrode layer 112, an insulating layer 113, and a common electrode layer 114. The pixel electrode layer 112 can include a plurality of pixel electrodes 112a and is arranged on the first base layer 111. The insulating layer 113 is arranged on the pixel electrode layer 112. The common electrode layer 114 can include a plurality of common electrodes 114a and is arranged on the insulating layer 113. The common electrode layer 114 is arranged between the liquid crystal layer 12 and the insulating layer 113.

The second substrate 13 can include a second base layer 131 and a touch sensing electrode layer 132. The touch sensing electrode layer 132 can include a plurality of touch sensing electrodes 132a and is arranged on the second base layer 131. The second base layer 131 is arranged between the touch sensing electrode layer 132 and the liquid crystal layer 12.

In at least one embodiment, a material of the first base layer 111 and the second base layer 131 can be transparent glass or plastic. In at least one embodiment, a material of the plurality of pixel electrodes 112a, the plurality of common electrodes 114a, and the plurality of touch sensing electrodes 132a can be indium tin oxide or indium zinc oxide.

Each of the common electrodes 114a can receive two types of a common voltage. When the common electrodes 114a receive a first common voltage, the common electrodes 114a can cooperatively induce a first electric field with corresponding pixel electrodes 112a to drive liquid crystals of the liquid crystal layer 12 to rotate to display according to data signals received by the pixel electrodes 112a. When the common electrodes 114a receive a second common voltage, the common electrodes 114a can cooperatively induce a second electric field with corresponding touch sensing electrodes 132a to transmit touch signals corresponding to touch input applied on the touch sensing electrodes 132a. The touch signals can be analyzed to determine coordinate points of the sensing electrodes 132a where the touch input was applied. In at least one embodiment, the first common voltage can be a direct current voltage, and the second common voltage can be an alternating current voltage.

Figure 3:
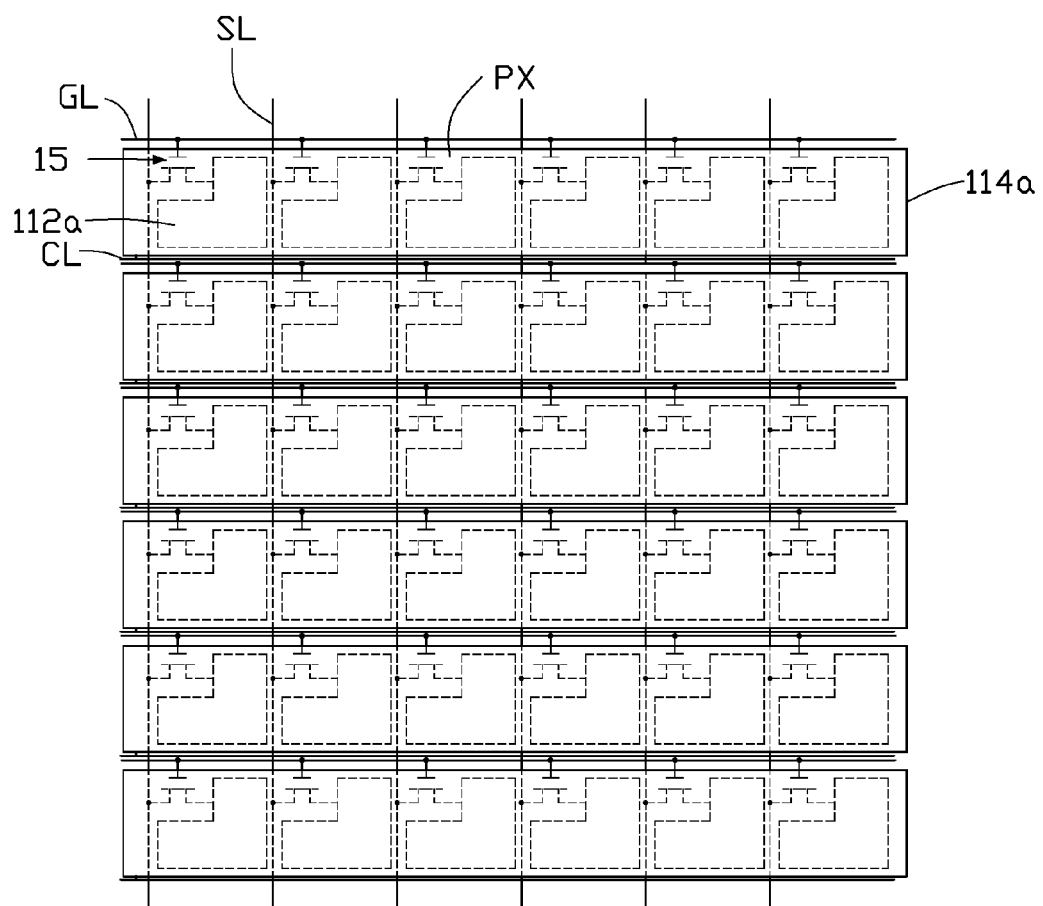
FIG. 3 is a diagrammatic view of a plurality of pixel units of the embedded touch screen display panel.
Figure 3:
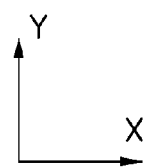

As illustrated in FIG. 3, the display panel 10 can include a plurality of pixel units PX arranged in a plurality of rows and a plurality of columns. The plurality of rows of pixel units PX can extend along a first direction X, and the plurality of columns of pixel units PX can extend along a second direction Y substantially perpendicular to the first direction X. Each pixel unit PX can include one corresponding pixel electrode 112a and a thin film transistor 15 (hereinafter "the TFT 15"). Each row of pixel units PX can be electrically coupled to a corresponding scan line GL, and each column of pixel units PX can be electrically coupled to a corresponding data line SL. A gate electrode of the TFT 15 can be electrically coupled to the scan line GL to receive a scan signal. A source electrode of the TFT 15 can be electrically coupled to the data line SL to receive a data signal when the gate electrode receives the scan signal. A drain electrode of the TFT 15 can be electrically coupled to the pixel electrode 112a to relay the data signal to the pixel electrode 112a. Each row of pixel units PX can constitute a pixel group. Each pixel group PX can correspond in planar coordinate space to one corresponding common electrode 114a. Thus, the plurality of rows of pixel units PX numbers the same as the plurality of the common electrodes 114a. Each common electrode 114a can be electrically coupled to a corresponding common voltage line CL to receive either the first common voltage or the second common voltage.

Figure 4:
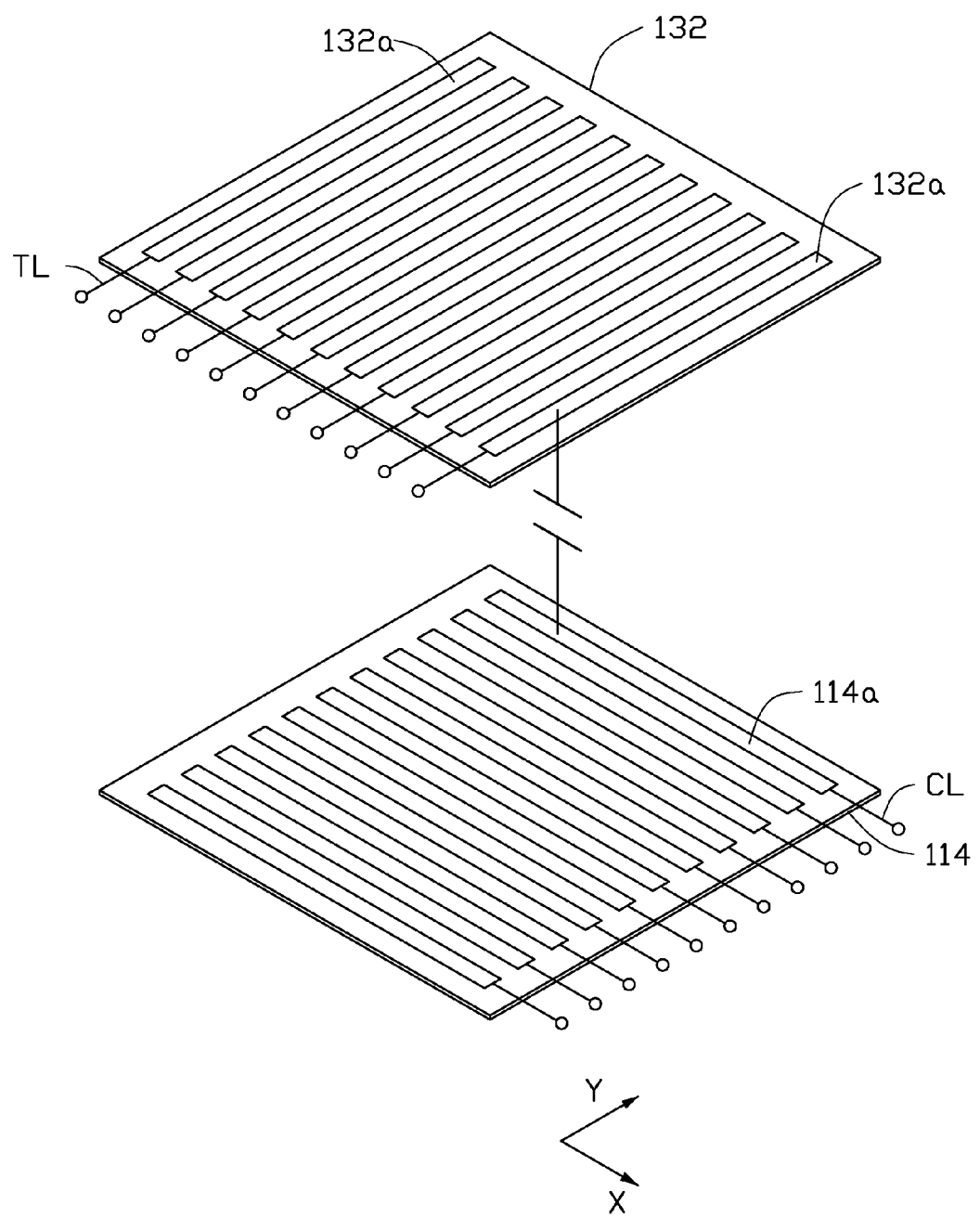
FIG. 4 is an isometric view of a common electrode layer and a touch sensing electrode layer of the embedded touch screen display panel.

As illustrated in FIG. 4, the plurality of common electrodes 114a of the common electrode layer 114 extend along the first direction X, and the plurality of touch sensing electrodes 132a of the touch sensing electrode layer 132 extend along the second direction Y. Thus, each common electrode 114a extends across a portion of each touch sensing electrode 132a. Each touch sensing electrode 132a can be electrically coupled to a corresponding touch signal line TL to transmit touch signals corresponding to touch input applied on the touch sensing electrode 132a. Each touch sensing electrode 132a can include a plurality of touch areas (not shown). Each touch area can correspond in planar coordinate space to one corresponding pixel unit PX. Thus, each common electrode 114a corresponding in planar coordinate space to the corresponding pixel group also corresponds in coordinate space to the corresponding touch areas of the touch sensing electrodes 132a. When the common electrodes 114a receive the second common voltage, the common electrodes 114a cooperatively induce the second electric field with the corresponding touch areas of the touch sensing electrodes 132a to enable the touch sensing electrodes 132a to transmit the touch signals along the corresponding touch signal lines TL.

Figure 5:
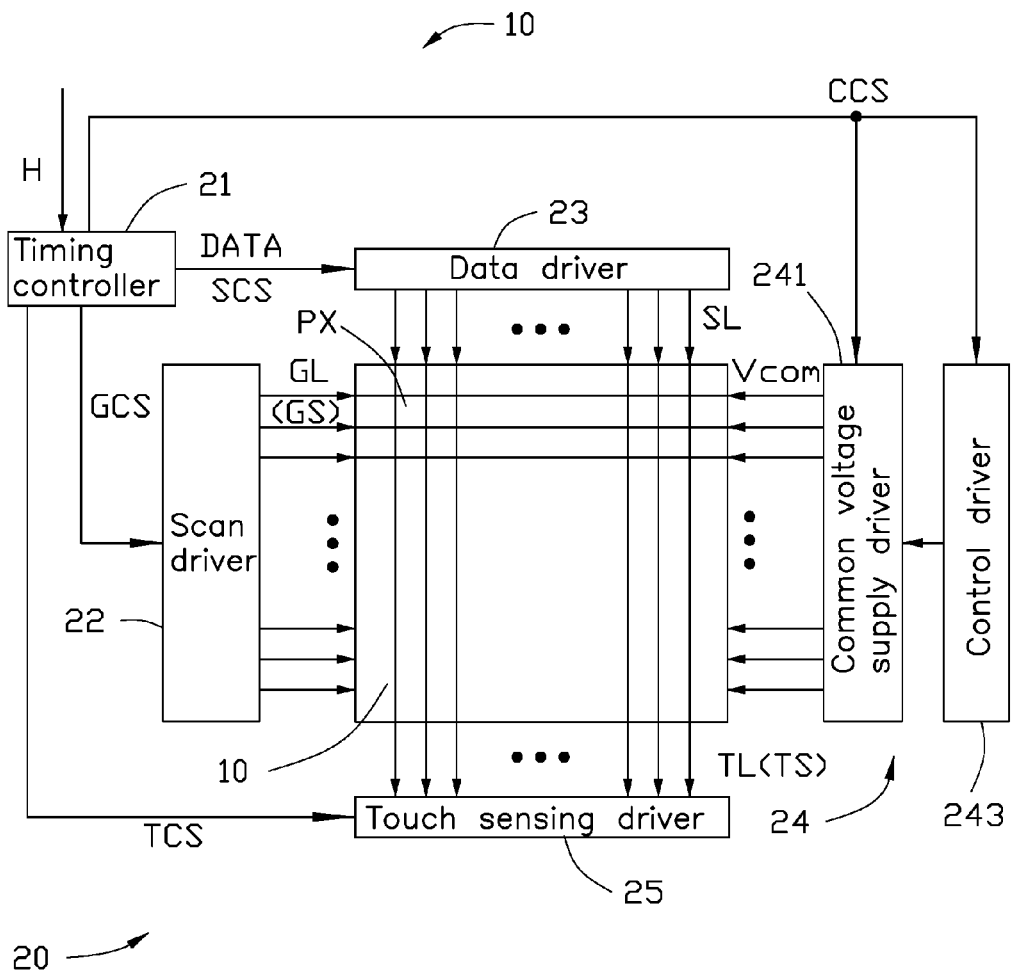
FIG. 5 is a block diagram of the embedded touch screen display panel.

As illustrated in FIG. 5, the display panel 10 can further include a timing controller 21, a scan driver 22, a data driver 23, a common voltage circuit 24, and a touch sensing driver 25. The scan driver 22 can transmit the scan signals (GS) along the scan lines GL to the corresponding pixel units PX. The data driver 23 can transmit the data signals (DATA) along the data lines SL to the corresponding pixel units PX. The common voltage circuit 24 can transmit the first common voltage and the second common voltage (Vcom) along the common voltage lines CL to the corresponding pixel units PX. The touch sensing driver 25 can receive the touch signals (TS) transmitted along the touch signals lines TL by the corresponding pixel units PX. The timing controller 21 can control, according to a planar synchronization signal (H), the scan driver 22 to transmit the scan signals GS, the data driver 23 to transmit the data signals DATA, the common voltage circuit 24 to transmit the first and second common voltages Vcom, and the touch sensing driver 25 to receive the touch signals TS.

The timing controller 21 controls the scan driver 22 by transmitting a gate control signal (GCS) to the scan driver 22. The timing controller 21 controls the data driver 23 by transmitting a source control signal (SCS) and the data signals DATA to the data driver 23. Thus, the data driver 23 receives the data signals DATA from the timing controller 21. The timing controller 21 controls the common voltage circuit 24 by transmitting a common voltage control signal (CCS) to the common voltage circuit 24. The timing controller 21 controls the touch sensing driver 25 by transmitting a touch control signal (TCS) to the touch sensing driver 25.

The common voltage circuit 24 can include a common voltage supply driver 241 and a control driver 243. The common voltage supply driver 241 can output the first common voltage and the second common voltage. The control driver 243 can control the common voltage supply driver 241 to output the first common voltage and the second common voltage.

Figure 6:
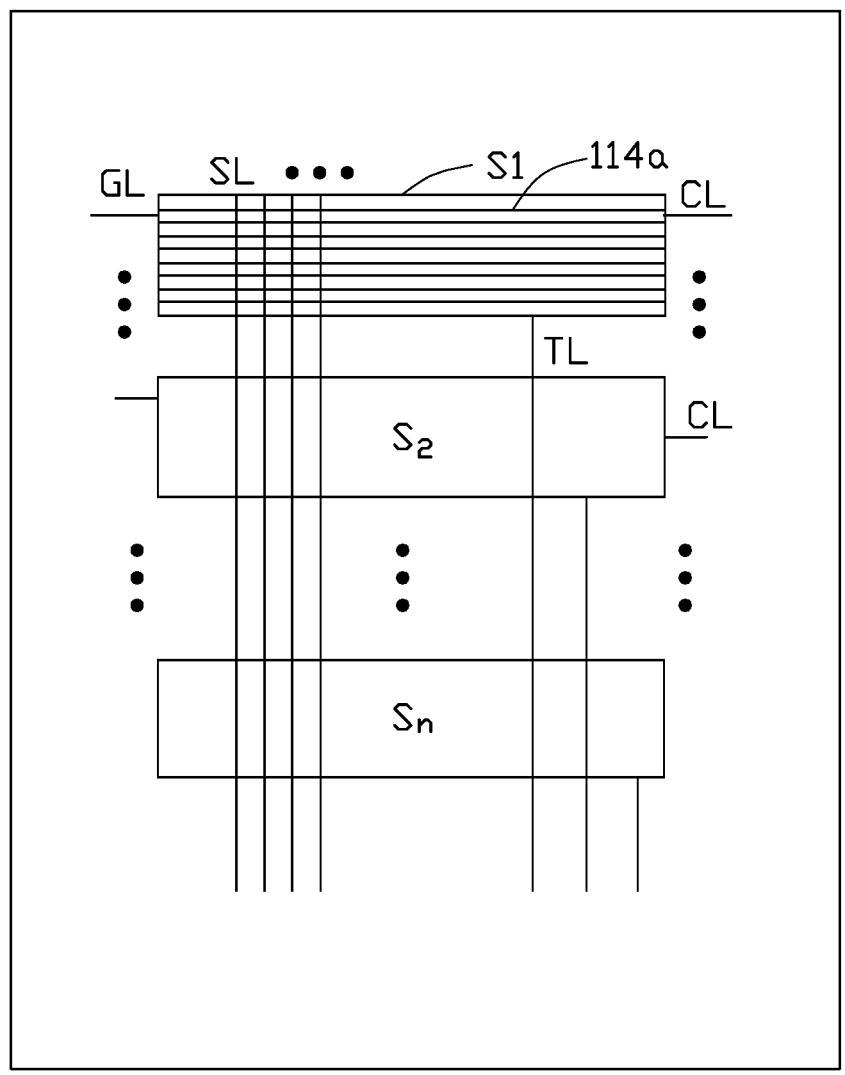
FIG. 6 is a diagrammatic view of an embodiment of a plurality of touch display groups of the embedded touch screen display panel.

Referring to FIG. 6, the plurality of pixel groups, the corresponding plurality of common electrodes 114a, and the corresponding plurality of touch areas of the touch sensing electrodes 132a can be divided into a plurality of touch display groups S1-Sn. Each of the plurality of touch display groups S1-Sn is operable in a first operation mode, a second operation mode, and a standby mode. In the first operation mode, all of the pixel groups of the touch display group operate in the display mode. In the second operation mode, all of the touch areas of the touch display group operate in the touch sensing mode. In the standby mode, the pixel groups of the touch display group do not operate in the display mode and the touch areas of the touch display group do not operate in the touch sensing mode. The plurality of touch display groups S1-Sn can operate in the first operation mode one at a time according to a first predetermined sequence and operate in the second operation mode one at a time according to a second predetermined sequence. The first predetermined sequence and the second predetermined sequence each include a plurality of time periods. A length of time of each of the plurality of touch display groups S1-Sn to operate in the first operation mode and the second operation mode is equal to a length of time of the corresponding time period of the first predetermined sequence and the second predetermined sequence, respectively.

Figure 7:
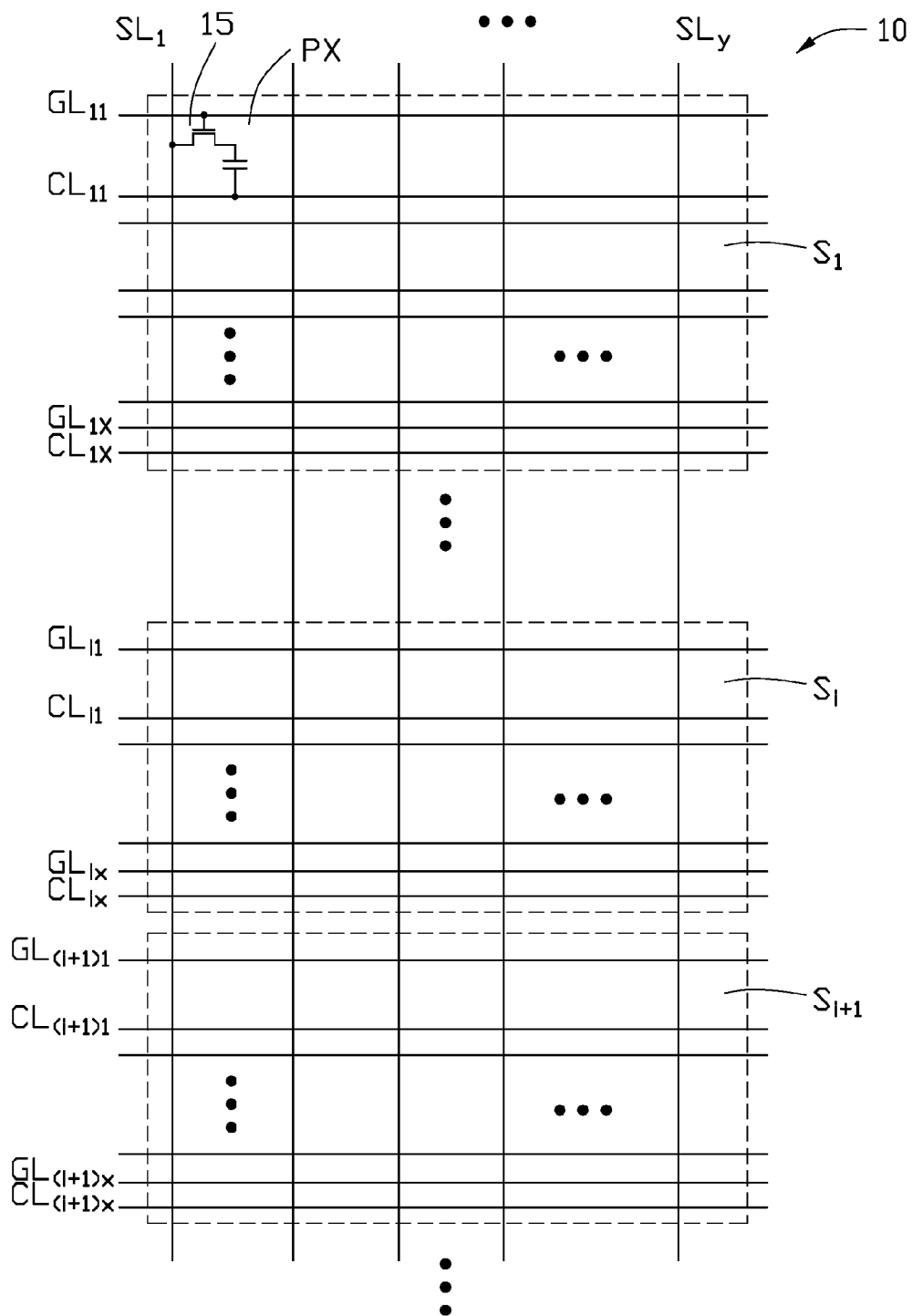
FIG. 7 is a circuit diagram of the plurality of touch display groups of the embedded touch screen display panel.

As illustrated in FIG. 7, each of the plurality of touch display groups S1-Sn can include the corresponding plurality of pixel groups, the corresponding plurality of common electrodes 112a, the corresponding plurality of scan lines, the corresponding plurality of common voltage lines, and the corresponding plurality of data lines. For example, a first touch display group S1 can include a plurality of scan lines GL11-GL1x and a plurality of common voltage lines CL11-CL1x. A touch display group Si can include a plurality of scan lines GLi1-GLix and a plurality of common voltage lines CLi1-CLix. A touch display group Si+1 can include a plurality of scan lines GL(i+1)1-GL(i+1)x and a plurality of common voltage lines CL(i+1)1-CL(i+1)x. Each of the plurality of touch display groups S1-Sn can receive the data signals from the same data lines SL1-SLy.

FIGS. 8-14 illustrate a first embodiment of the first predetermined sequence and the second predetermined sequence of the plurality of touch display groups S1-Sn.

Figure 8:
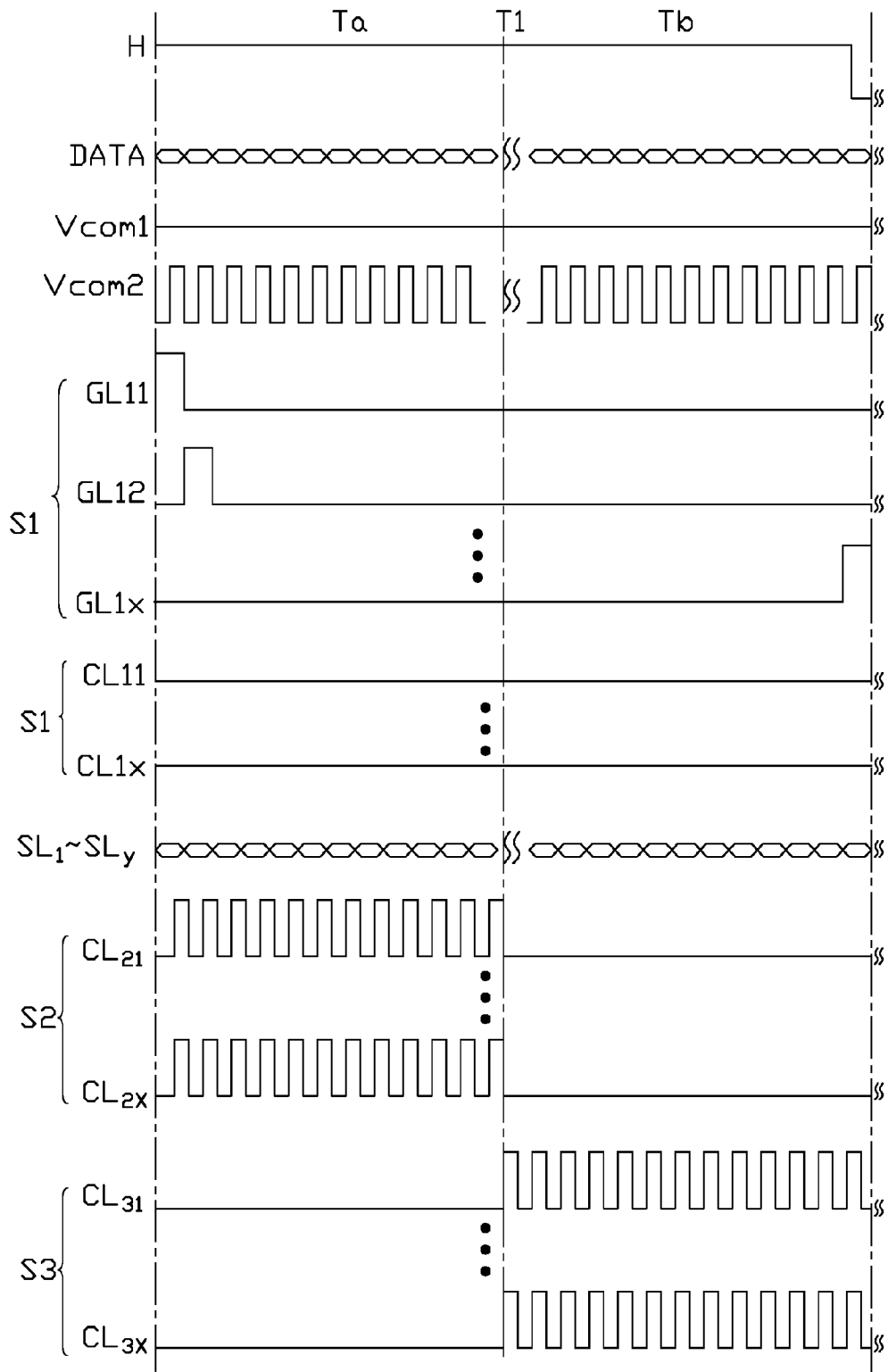
FIG. 8 is a waveform diagram of a first period of a first embodiment of a driving mechanism of the embedded touch screen display panel.

As illustrated in FIG. 8, a frequency of the second predetermined sequence can be twice as fast as a frequency of the first predetermined sequence. The plurality of time periods of the first and second predetermined sequences can be controlled by the planar synchronization signal H. For example, each time period of the first predetermined sequence can include two time periods Ta and Tb of the second predetermined sequence. During a first time period T1 of the first predetermined sequence, the scan lines GL11-GL1x of the first touch display group S1 receive the scan signals, the corresponding pixel groups of the first touch display group S1 receive the data signals (DATA) from the data lines SL1-SLy, and the common voltage lines CL11-CL1x receive the first common voltage (Vcom1). Thus, the first touch display group S1 operates in the first operation mode, and the corresponding pixel groups of the first touch display group S1 operate in the display mode. During the corresponding time period Ta of the second predetermined sequence during the first time period T1, a plurality of common voltage lines CL21-CL2x of a second touch display group S2 receives the second common voltage (Vcom2). Thus, the corresponding touch areas of the second touch display group S2 can transmit the touch signals corresponding to touch input thereon to the touch sensing driver 25 to analyze the coordinate points of the touch areas where the touch input is applied. During the corresponding time period Tb of the second predetermined sequence of the first time period T1, a plurality of common voltage lines CL31-CL3x of a third touch display group S3 receives the second common voltage Vcom2. Thus, the corresponding touch areas of the third touch display group S3 can transmit the touch signals corresponding to touch input thereon to the touch sensing driver 25 to analyze the coordinate points of the touch areas where the touch input is applied.

In at least one embodiment, a frequency of the first predetermined sequence can be 60 hertz (Hz), and a frequency of the second predetermined sequence can be 120 Hz.

Figure 9:
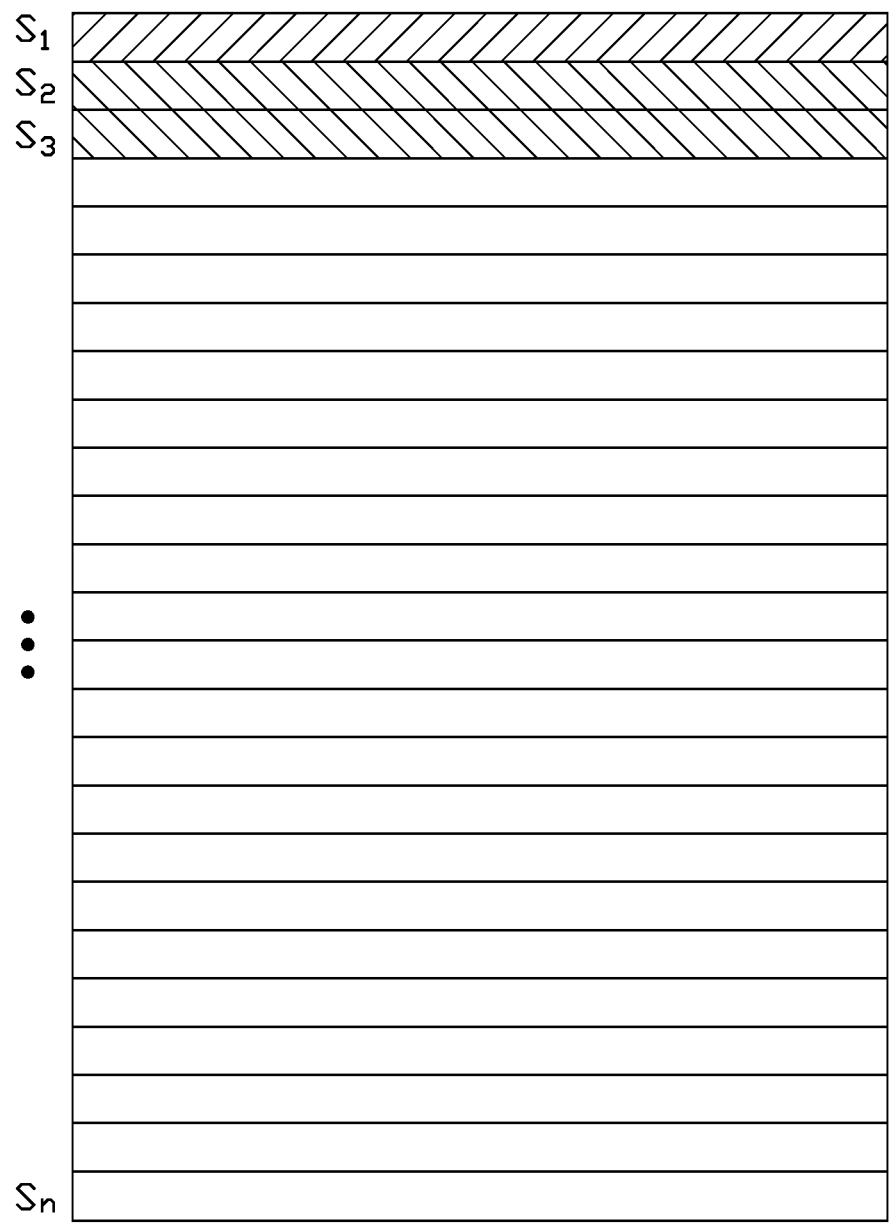
FIG. 9 is a diagrammatic view of FIG. 8.

As illustrated in FIG. 9, in the first embodiment of the first predetermined sequence and the second predetermined sequence, the first predetermined sequence can begin on the first touch display group S1, and the second predetermined sequence can begin on the second touch display group S2.

Figure 10:
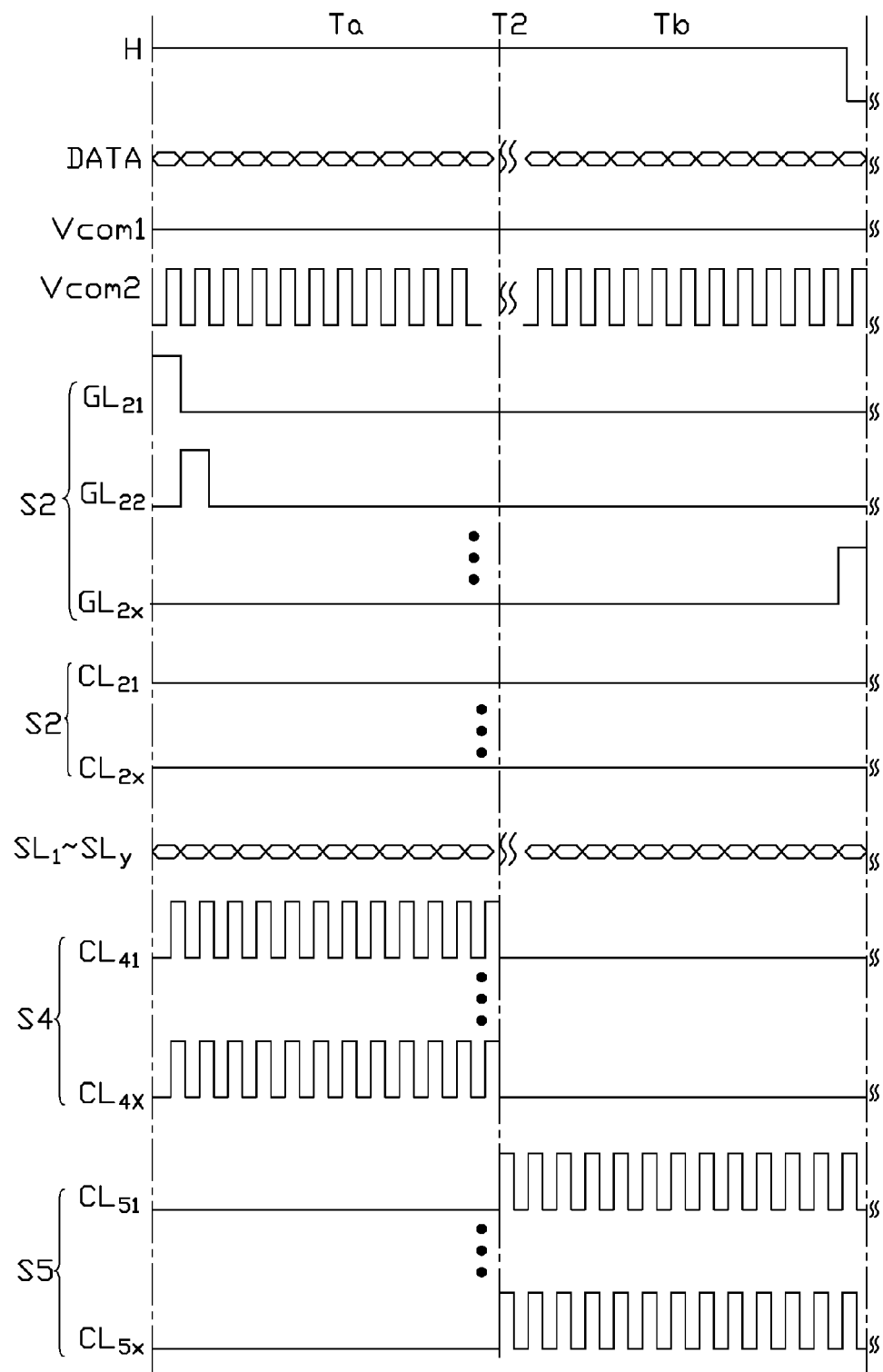
FIG. 10 is a waveform diagram of a second period of the first embodiment of the driving mechanism of the embedded touch screen display panel.

As illustrated in FIG. 10, during a second time period T2 of the first predetermined sequence, a plurality of scan lines GL21-GL2x of the second touch display group S2 receives the scan signals, the corresponding pixel groups of the second touch display group S2 receive the data signals (DATA) from the data lines SL1-SLy, and a plurality of common voltage lines CL21-CL2x receives the first common voltage Vcom1. Thus, the second touch display group S2 operates in the first operation mode, and the corresponding pixel groups of the second touch display group S2 operates in the display mode. During the corresponding time period Ta of the second predetermined sequence during the second time period T2, a plurality of common voltage lines CL41-CL4x of a fourth touch display group S4 receives the second common voltage Vcom2. Thus, the corresponding touch areas of the fourth touch display group S4 can transmit the touch signals corresponding to touch input thereon to the touch sensing driver 25 to analyze the coordinate points of the touch areas where the touch input is applied. During the corresponding time period Tb of the second predetermined sequence during the second time period T2, a plurality of common voltage lines CL51-CL5x of a fifth touch display group S5 receives the second common voltage Vcom2. Thus, the corresponding touch areas of the fifth touch display group S5 can transmit the touch signals corresponding to touch input thereon to the touch sensing driver 25 to analyze the coordinate points of the touch areas where the touch input is applied.

Figure 11:
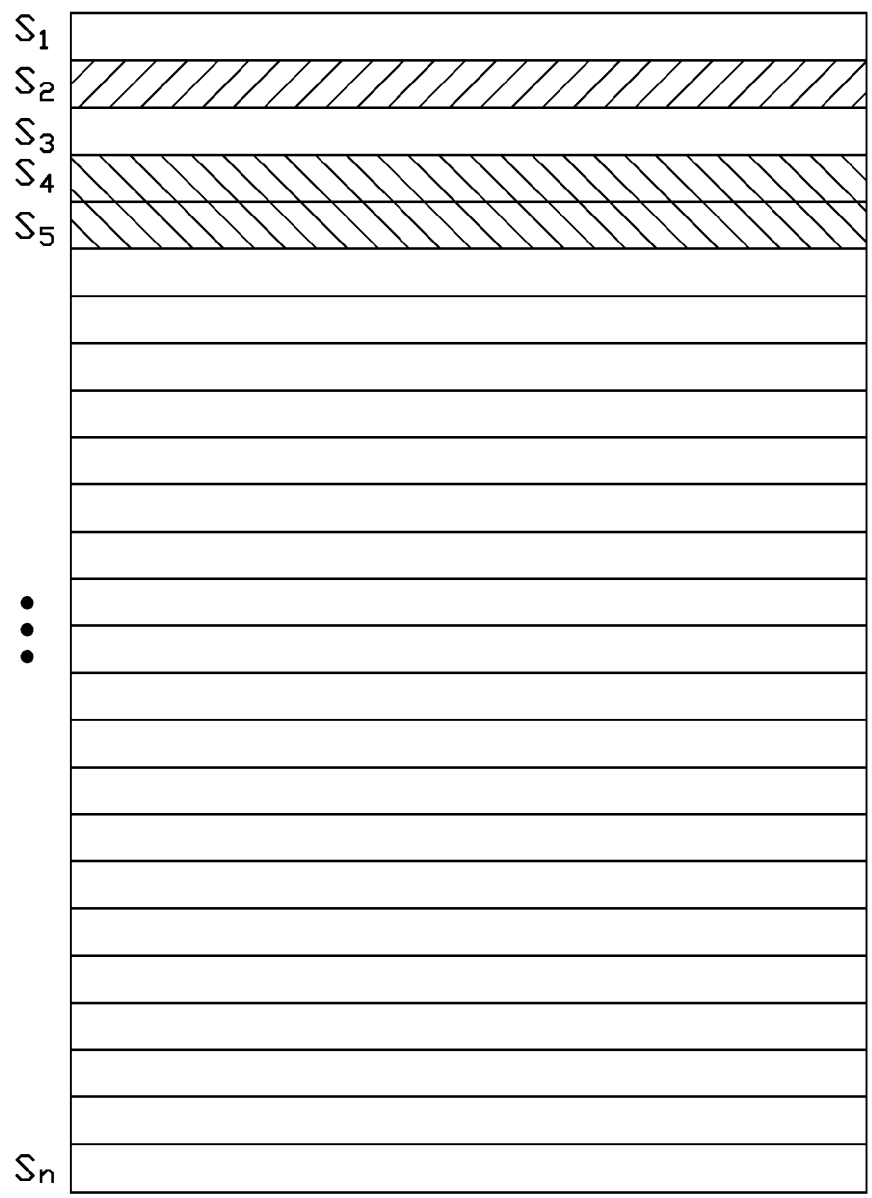
FIG. 11 is a diagrammatic view of FIG. 10.

As illustrated in FIG. 11, the first predetermined sequence and the second predetermined sequence can both progress one at a time in a direction toward the last touch display group Sn. Because the frequency of the second predetermined sequence is twice as fast as the frequency of the first predetermined sequence, the second predetermined sequence progresses toward the last touch display group Sn faster than the first predetermined sequence.

Figure 12:
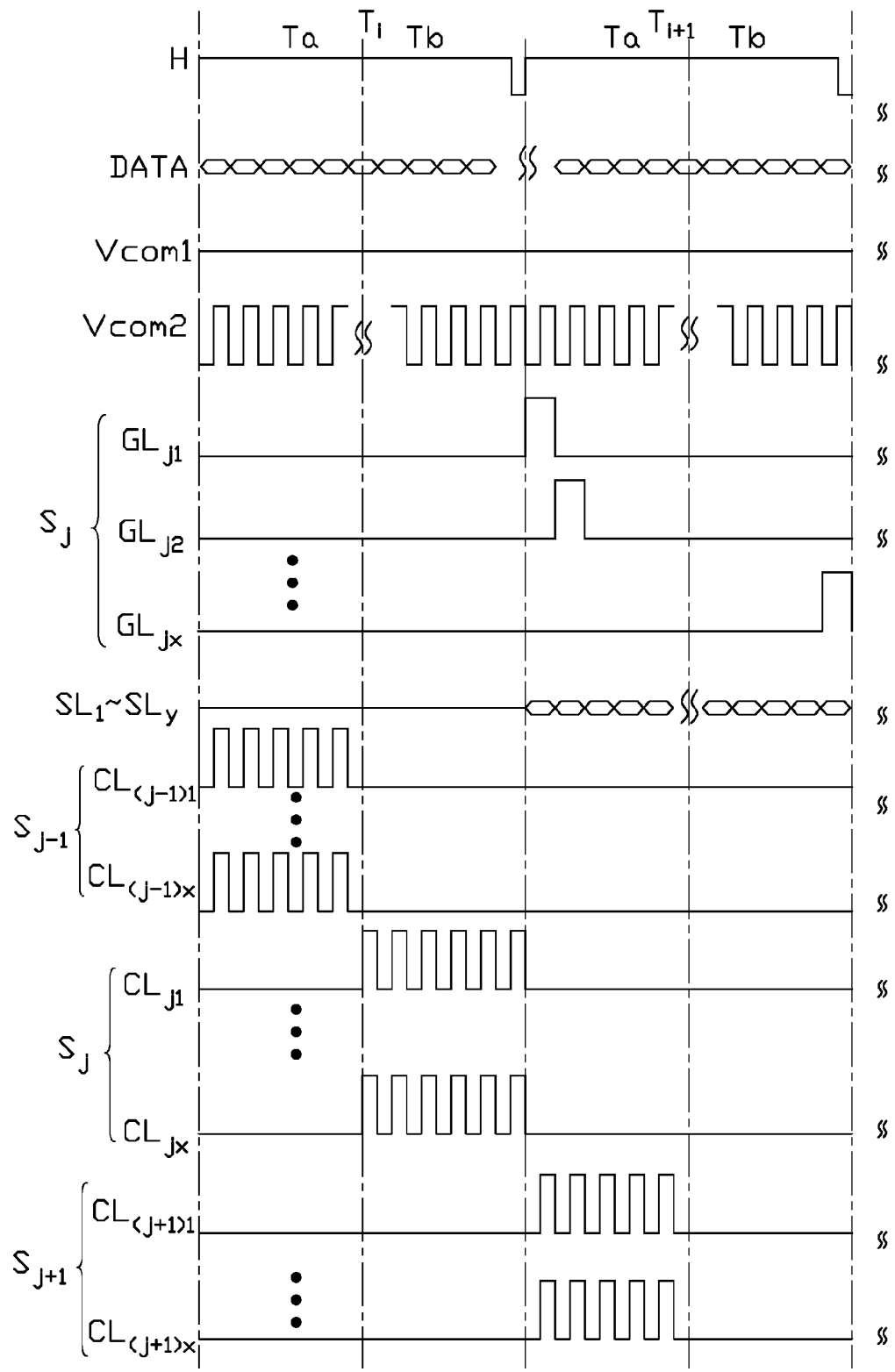
FIG. 12 is a waveform diagram of two consecutive periods of the first embodiment of the driving mechanism of the embedded touch screen display panel.
Figure 13:
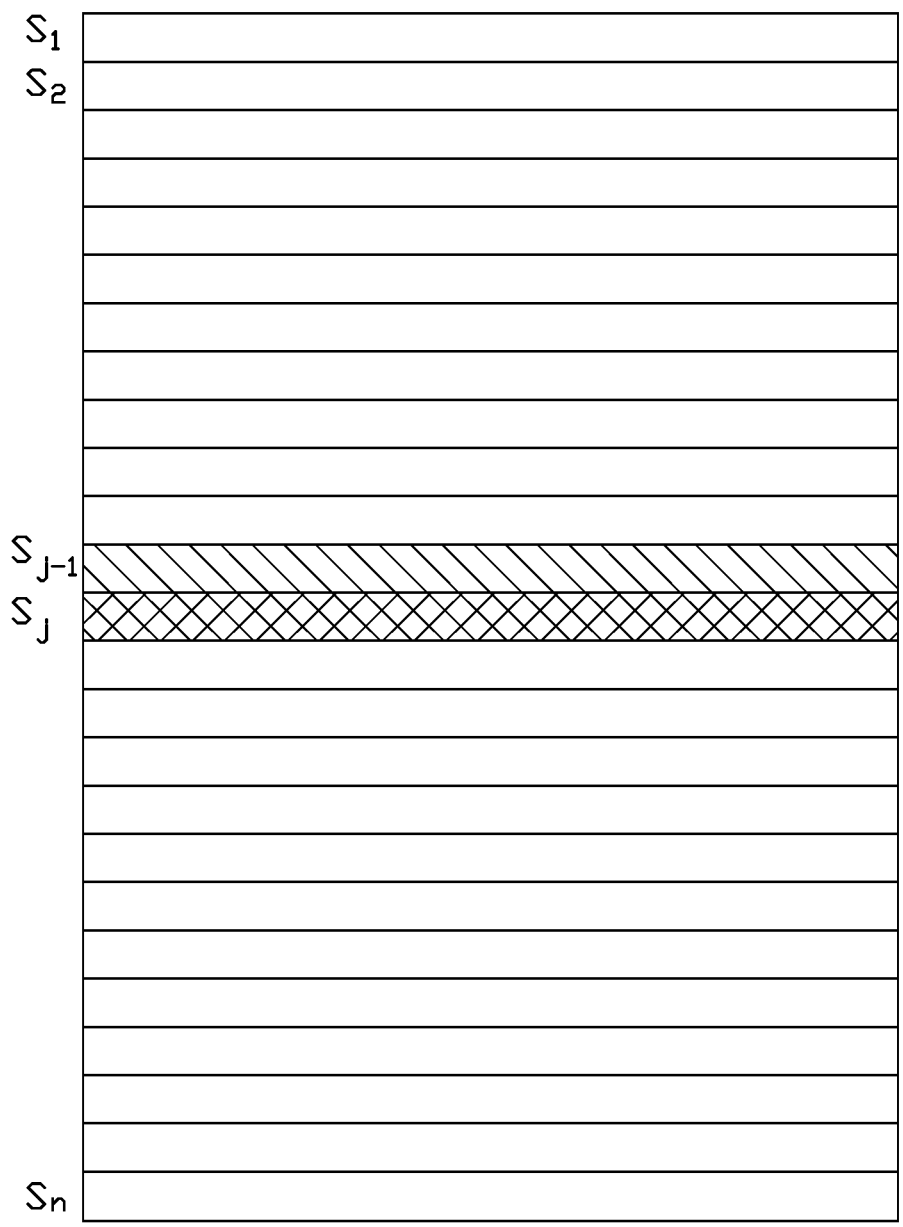
FIG. 13 is a diagrammatic view of a first period of the two consecutive periods of FIG. 12.
Figure 14:
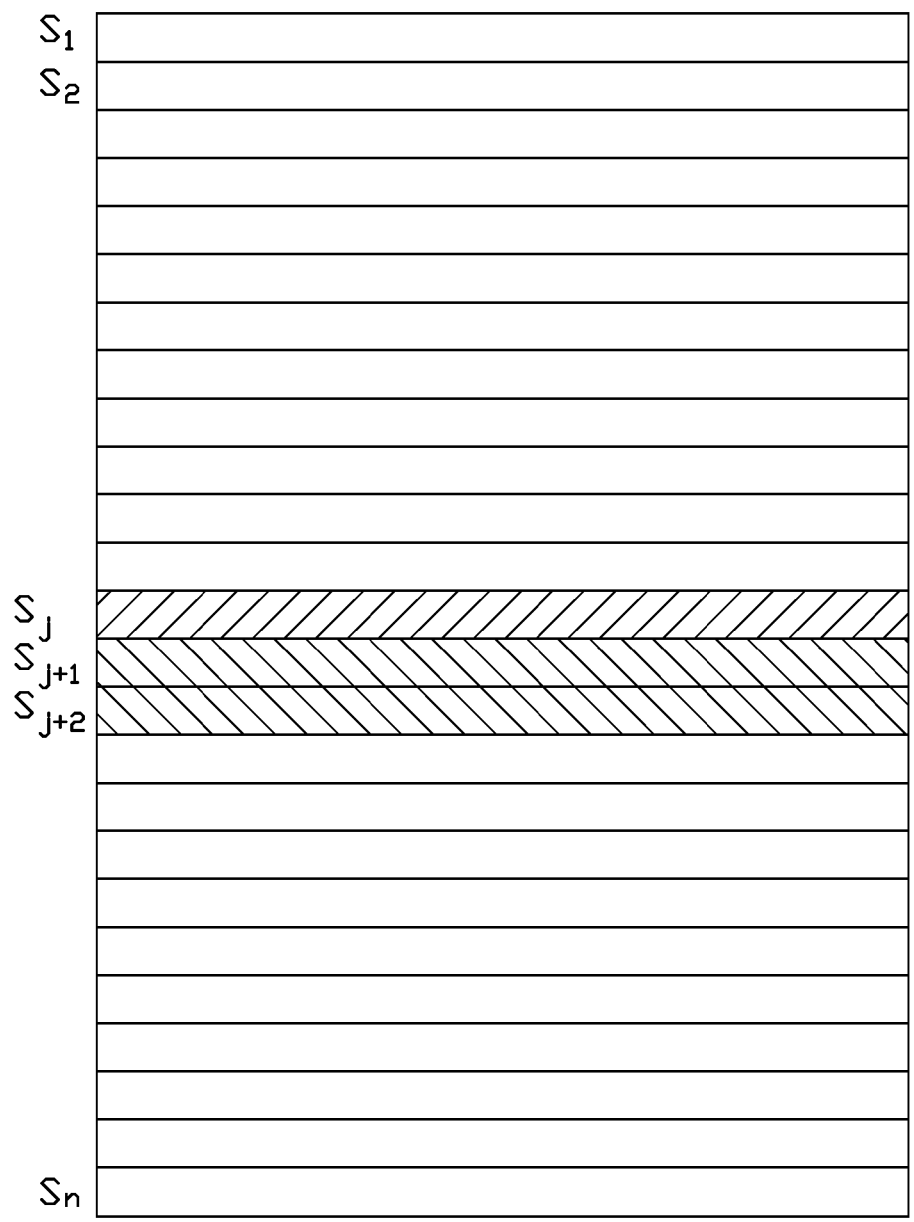
FIG. 14 is a diagrammatic view of a second period of the two consecutive periods of FIG. 12.

FIGS. 12-14 illustrate the second predetermined sequence having already repeated after reaching the last touch display group Sn and overlapping with and passing the first predetermined sequence on the touch display group Sj.

As illustrated in FIG. 12 and FIG. 13, during a time period Ti when the first predetermined sequence and the second predetermined sequence overlap on the touch display group Sj, the scan signals are temporarily stopped being transmitted to a plurality of scan lines GLj1-GLjx of the touch display group Sj. During the corresponding time period Ta of the second predetermined sequence during the time period Ti, a plurality of common voltage lines CL(j−1)1-CL(j−1)x of a touch display group Sj−1 receives the second common voltage Vcom2. Thus, the corresponding touch areas of the touch display group Sj−1 can transmit the touch signals corresponding to touch input thereon to the touch sensing driver 25 to analyze the coordinate points of the touch areas where the touch input is applied. During the corresponding time period Tb of the second predetermined sequence during the time period Ti, a plurality of common voltage lines CLj1-CLjx of the touch display group Sj receives the second common voltage Vcom2. Thus, the corresponding touch areas of the touch display group Sj can transmit the touch signals corresponding to touch input thereon to the touch sensing driver 25 to analyze the coordinate points of the touch areas where the touch input is applied.

As illustrated in FIG. 12 and FIG. 14, during a next time period Ti+1 after the time period Ti, the second predetermined sequence does not overlap with the first predetermined sequence, and so the scan lines GLj1-GLjx receive the scan signals and the corresponding data signals. Thus, the touch display group Sj operates in the first operation mode, and the corresponding pixel groups of the touch display group Sj operate in the display mode. During the corresponding time period Ta of the second predetermined sequence during the time period Ti+1, a plurality of common voltage lines CL(j+1)1–CL(j+1)x of a touch display group Sj+1 receives the second common voltage Vcom2. Thus, the corresponding touch areas of the touch display group Sj+1 can transmit the touch signals corresponding to touch input thereon to the touch sensing driver 25 to analyze the coordinate points of the touch areas where the touch input is applied. During the corresponding time period Tb of the second predetermined sequence during the time period Ti, a plurality of common voltage lines of a touch display group Sj+2 (shown in FIG. 14) receives the second common voltage Vcom2. Thus, the corresponding touch areas of the touch display group Sj+2 can transmit the touch signals corresponding to touch input thereon to the touch sensing driver 25 to analyze the coordinate points of the touch areas where the touch input is applied.

FIGS. 15-21 illustrate a second embodiment of the first predetermined sequence and the second predetermined sequence of the plurality of touch display groups S1-Sn.

Figure 15:
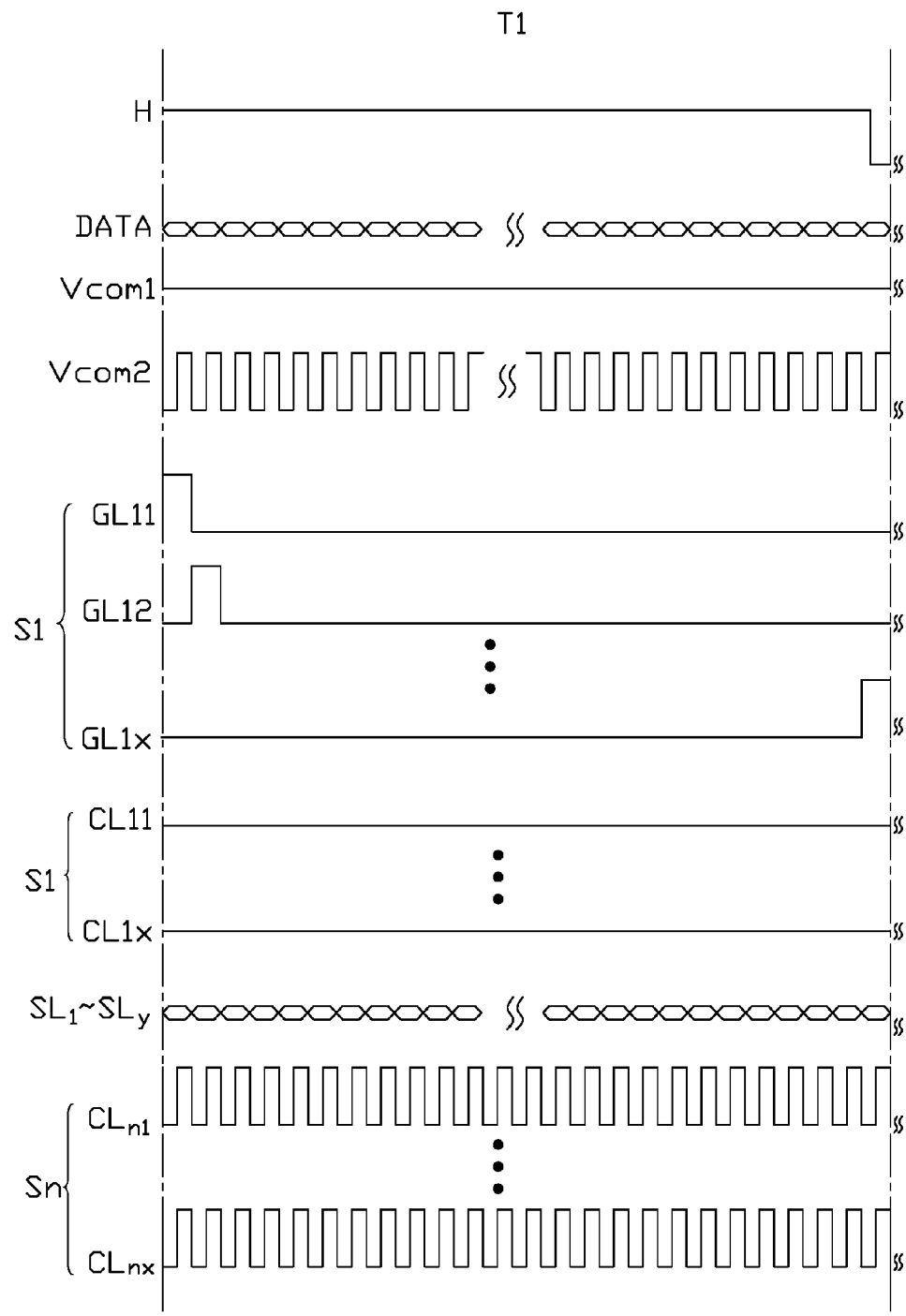
FIG. 15 is a waveform diagram of a first period of a second embodiment of a driving mechanism of the embedded touch screen display panel.

As illustrated in FIG. 15, a frequency of the second predetermined sequence can be equal to a frequency of the first predetermined sequence. The plurality of time periods of the first and second predetermined sequences can be controlled by the planar synchronization signal H. During a first time period T1 of the first predetermined sequence and of the second predetermined sequence, the scan lines GL11-GL1x of the first touch display group S1 receive the scan signals, the corresponding pixel groups of the first touch display group S1 receive the data signals DATA from the data lines SL1-SLy, and the common voltage lines CL11-CL1x receive the first common voltage Vcom1. Thus, the first touch display group S1 operates in the first operation mode, and the corresponding pixel groups of the first touch display group S1 operate in the display mode. Also during the first time period T1, a plurality of common voltage lines CLn1-CLnx of the last touch display group Sn receives the second common voltage Vcom2. Thus, the corresponding touch areas of the last touch display group Sn can transmit the touch signals corresponding to touch input thereon to the touch sensing driver 25 to analyze the coordinate points of the touch areas where the touch input is applied.

Figure 16:
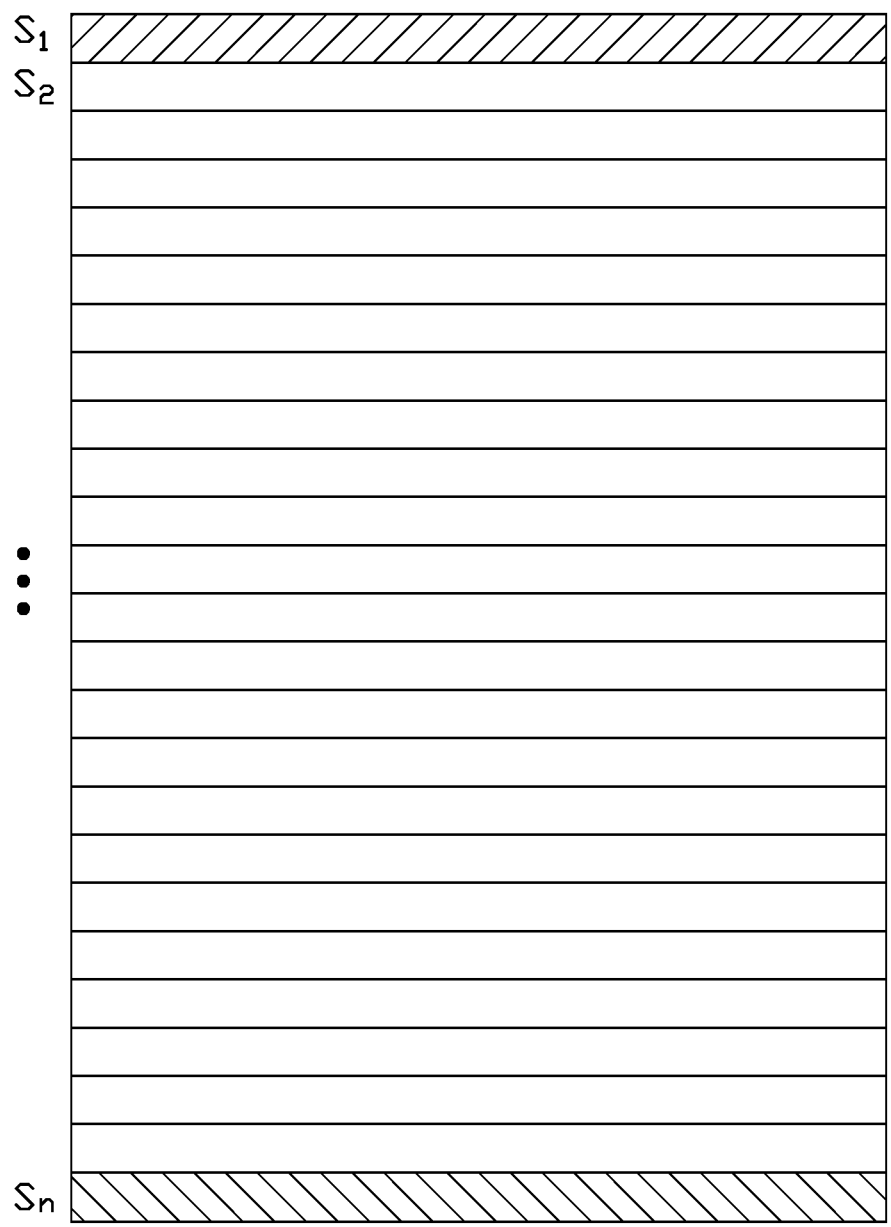
FIG. 16 is a diagrammatic view of FIG. 15.

As illustrated in FIG. 16, the first touch display group S1 operates in the first operation mode while the last touch display group Sn operates in the second operation mode.

Figure 17:
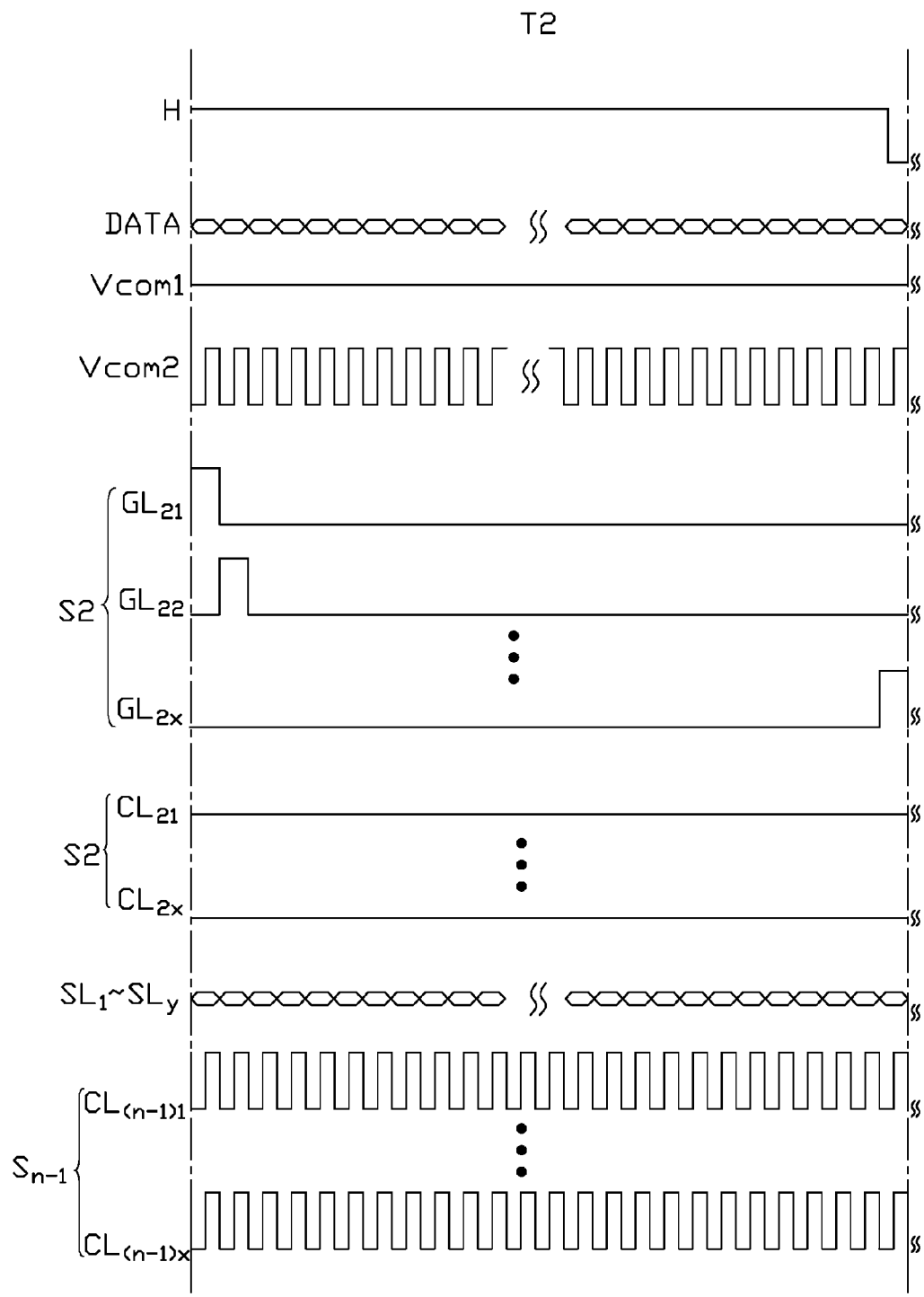
FIG. 17 is a waveform diagram of a second period of the second embodiment of a driving mechanism of the embedded touch screen display panel.

As illustrated in FIG. 17, during a second time period T2 of the first predetermined sequence and of the second predetermined sequence, the scan lines GL21-GL2x of the second touch display group S2 receive the scan signals, the corresponding pixel groups of the second touch display group S2 receive the data signals DATA from the data lines SL1-SLy, and the common voltage lines CL21-CL2x receive the first common voltage Vcom1. Thus, the second touch display group S2 operates in the first operation mode, and the corresponding pixel groups of the second touch display group S1 operate in the display mode. Also during the second time period T2, a plurality of common voltage lines CL(n-1)1–CL(n-1)x of a second to last touch display group Sn-1 receives the second common voltage Vcom2. Thus, the corresponding touch areas of the second to last touch display group Sn-1 can transmit the touch signals corresponding to touch input thereon to the touch sensing driver 25 to analyze the coordinate points of the touch areas where the touch input is applied.

Figure 18:
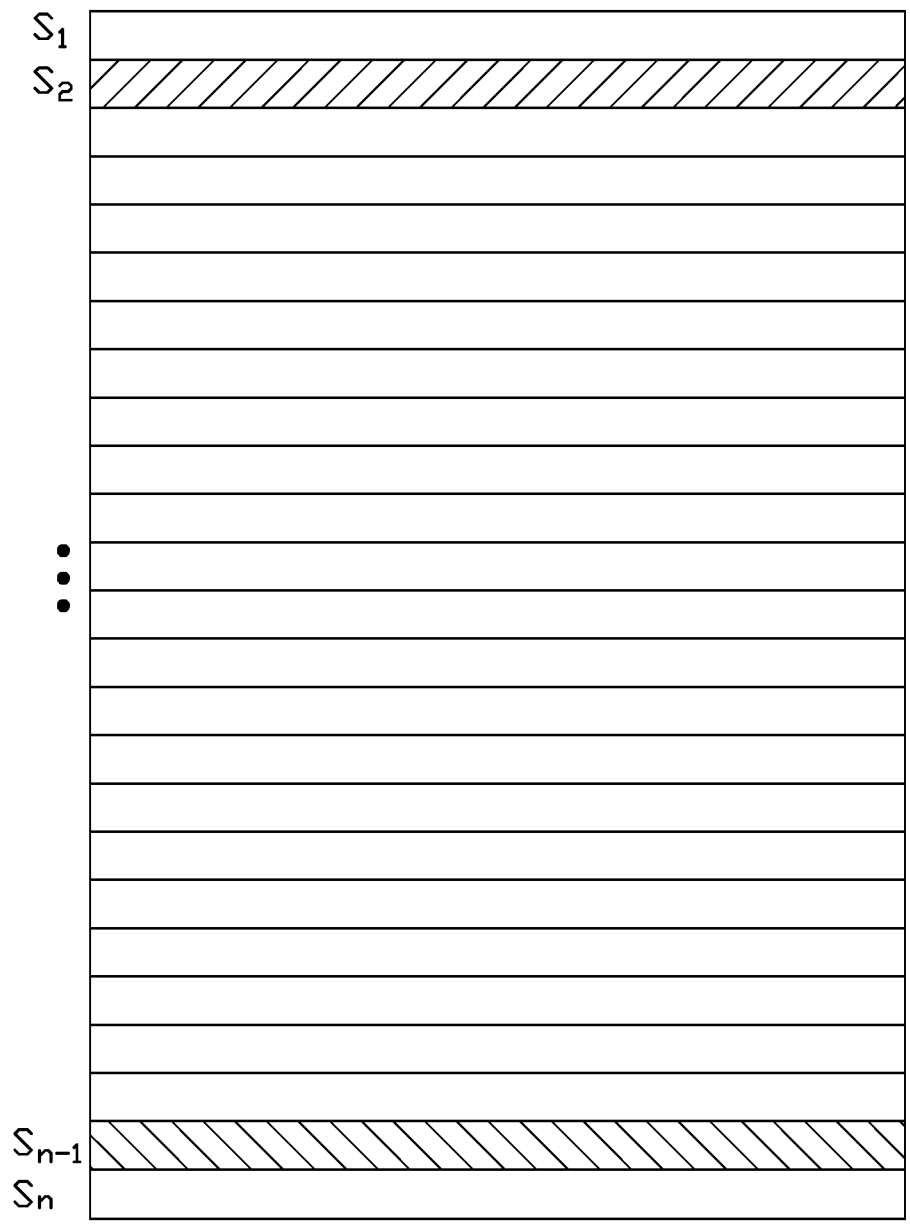
FIG. 18 is a diagrammatic view of FIG. 17.

As illustrated in FIG. 18, during the second time period T2, the second touch display group S2 operates in the first operation mode, and the second to last touch display group Sn-1 operates in the second operation mode. Thus, the direction of progression of the first predetermined sequence is opposite the direction of progression of the second predetermined sequence.

Figure 19:
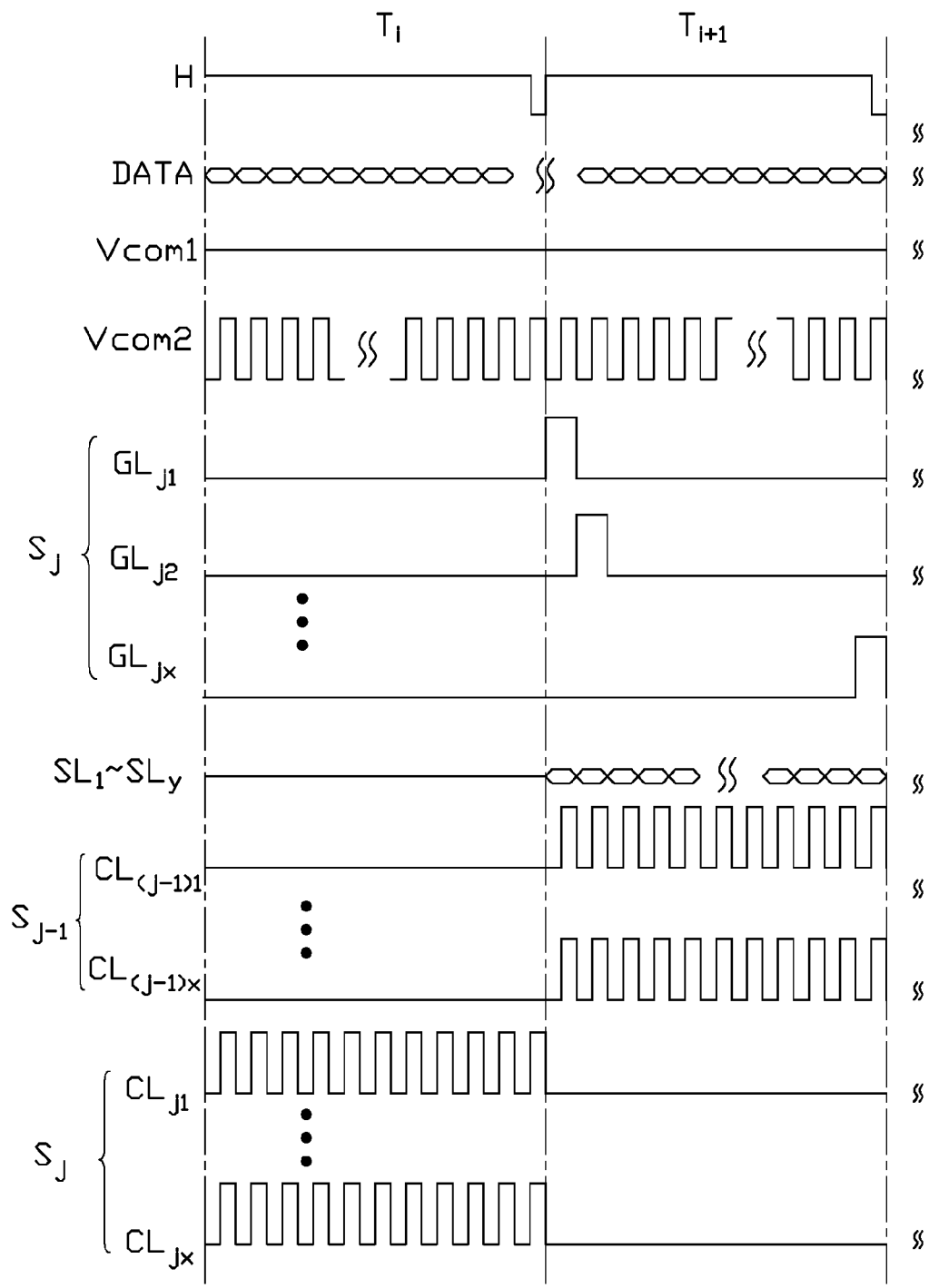
FIG. 19 is a waveform diagram of two consecutive periods of the second embodiment of the driving mechanism of the embedded touch screen display panel.
Figure 20:
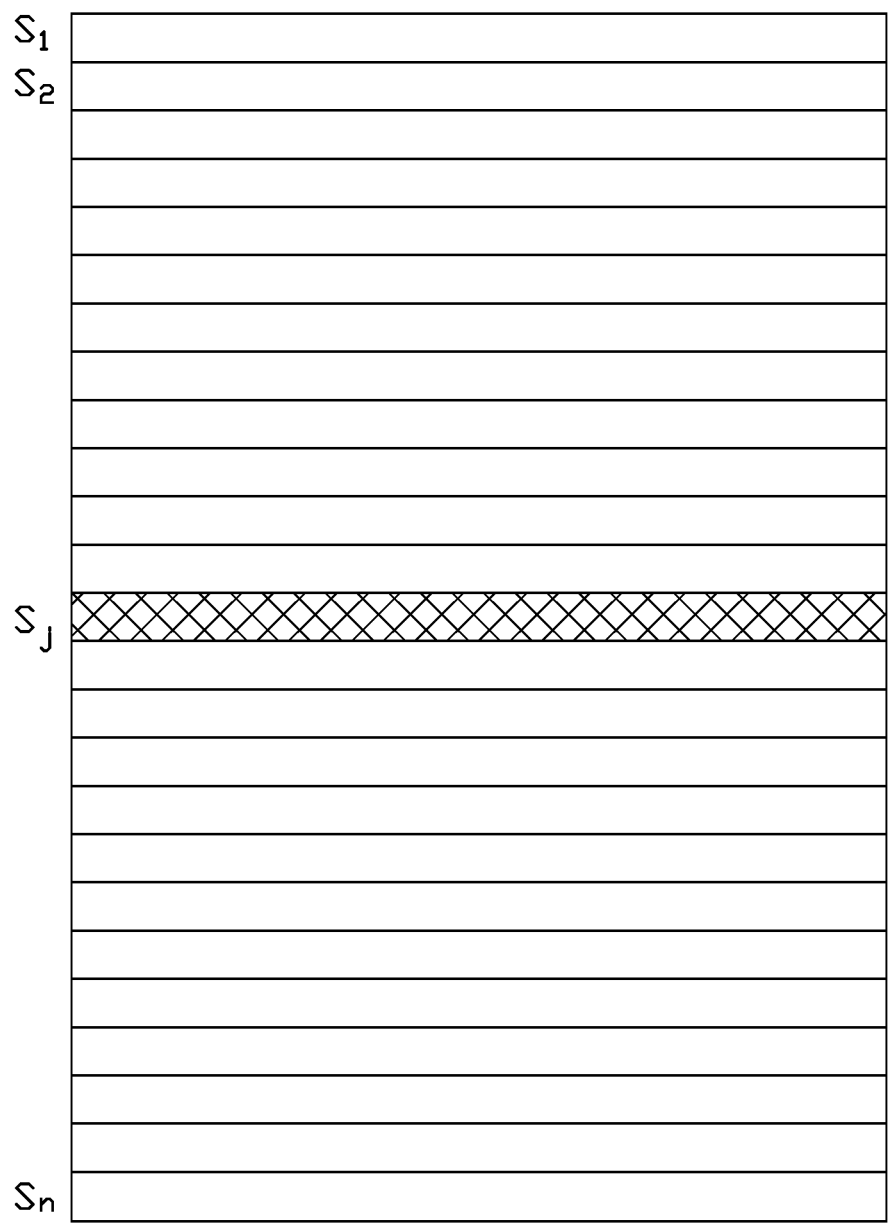
FIG. 20 is a diagrammatic view of a first period of the two consecutive periods of FIG. 19.
Figure 21:
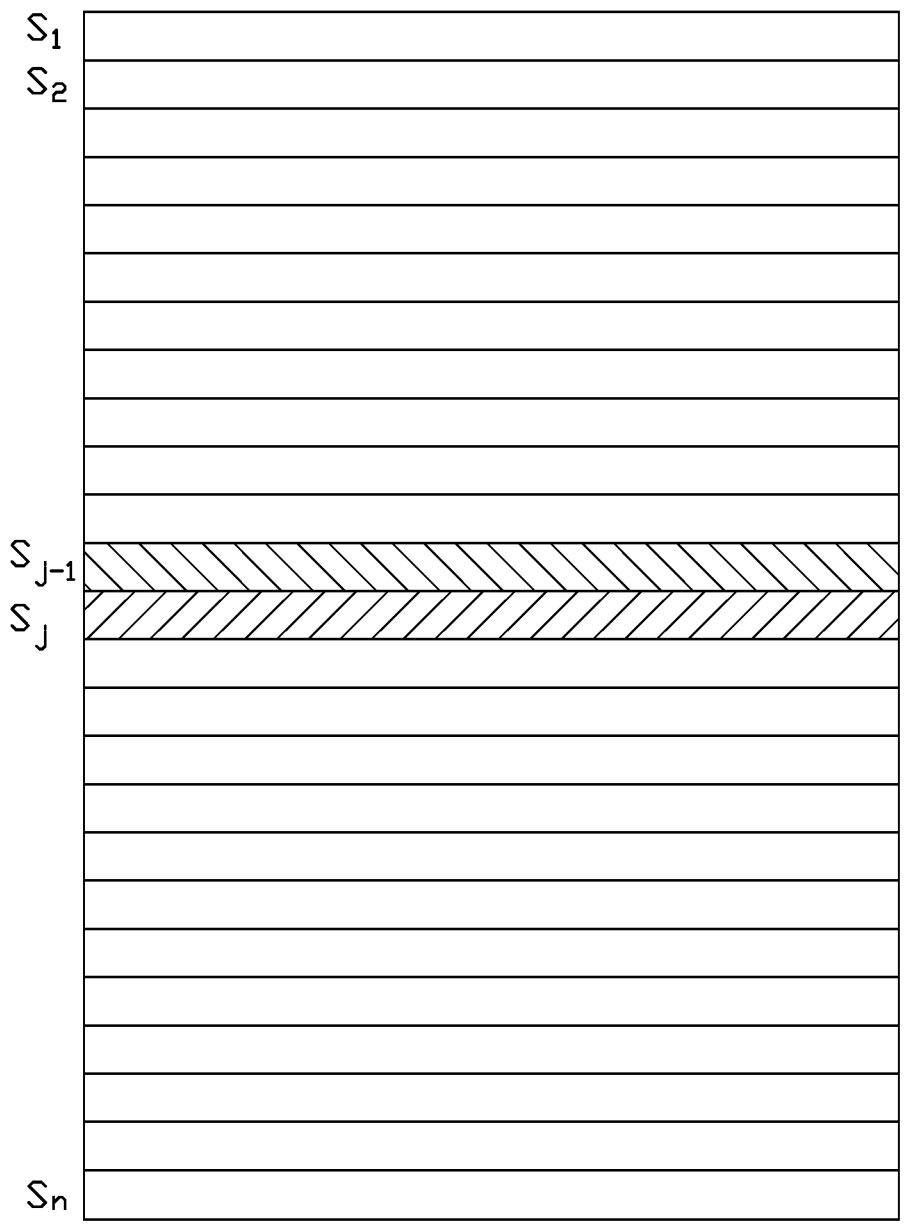
FIG. 21 is a diagrammatic view of a second period of the two consecutive periods of FIG. 19.

FIGS. 19-21 illustrate the first predetermined sequence and the second predetermined sequence overlapping and passing each other on the touch display group Sj.

As illustrated in FIG. 19, during a time period Ti when the first predetermined sequence and the second predetermined sequence overlap on the touch display group Sj, the scan signals are temporarily stopped being transmitted to the plurality of scan lines GLj1-GLjx of the touch display group Sj. Instead, the second common voltage Vcom2 is transmitted to the plurality of common voltage lines CLj1-CLjx of the touch display group Sj. Thus, the corresponding touch areas of the touch display group Sj can transmit the touch signals corresponding to touch input thereon to the touch sensing driver 25 to analyze the coordinate points of the touch areas where the touch input is applied.

As illustrated in FIG. 19 and FIG. 21, during a next time period Ti+1 of the first predetermined sequence after the time period Ti, the second predetermined sequence does not overlap with the first predetermined sequence, and so the scan lines GLj1-GLjx receive the scan signals and the corresponding data signals. Thus, the touch display group Sj operates in the first operation mode, and the corresponding pixel groups of the touch display group Sj operate in the display mode. Also during the time period Ti+1 of the second predetermined sequence, the plurality of common voltage lines CL(j-1)1–CL(j-1)x of the touch display group Sj-1 receives the second common voltage Vcom2. Thus, the corresponding touch areas of the touch display group Sj-1 can transmit the touch signals corresponding to touch input thereon to the touch sensing driver 25 to analyze the coordinate points of the touch areas where the touch input is applied.

In at least one embodiment, a length of time of each period of the first predetermined sequence is 16.7 milliseconds per touch display group (ms/n). Thus, it takes 16.7 milliseconds for all of the touch display groups of the display panel 10 to operate one at a time in the first operation mode.

In other embodiments, the frequencies of the first and second predetermined sequences can be changed, and the first and second predetermined sequences can start on different touch display groups.

Because some pixel groups of the display panel 10 can operate in the display mode while some touch sensing electrodes operate in the touch sensing mode, a resolution ratio of the display panel 10 is increased.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An embedded touch screen display panel driving mechanism comprising:
 a first substrate;
 a plurality of common electrodes arranged in the first substrate, each of the plurality of common electrodes configured to receive one of two types of a common voltage;

a plurality of pixel units each comprising a pixel electrode arranged in the first substrate, the plurality of pixel units arranged in a plurality of pixel groups, each of the plurality of pixel groups corresponding in planar coordinate space to a corresponding one of the plurality of common electrodes and operable in a display mode to drive, upon the corresponding common electrode receiving a first common voltage, liquid crystals of a liquid crystal layer according to corresponding data signals;

a second substrate; and a plurality of touch sensing electrodes arranged in the second substrate, each of the plurality of touch sensing electrodes comprising a plurality of touch areas, each of the plurality of touch areas corresponding in planar coordinate space to corresponding one of the plurality of pixel units, each of the plurality of pixel groups corresponding in planar coordinate space to corresponding touch areas, and the plurality of touch areas corresponding in planar coordinate space to each pixel group being operable, upon the corresponding common electrodes corresponding in planar coordinate space to the pixel group receiving a second common voltage, in a touch sensing mode to detect touch operations thereon, wherein the plurality of common electrodes, the corresponding plurality of pixel groups corresponding in planar coordinate space to the plurality of common electrodes, and the corresponding plurality of touch areas corresponding in planar coordinate space to the plurality of pixel groups are divided into a plurality of touch display groups, each of the plurality of touch display groups comprising two or more common electrodes, the corresponding two or more pixel groups, and the corresponding plurality of touch areas of the touch sensing electrodes corresponding in planar coordinate space to the two or more pixel groups;

wherein each of the plurality of touch display groups is operable in a first operation mode, a second operation mode, and a standby mode, the first operation mode being all of the pixel groups of the touch display group sequentially operating in the display mode, the second operation mode being all of the touch areas of the touch display group operating in the touch sensing mode, and the standby mode being all of the pixel groups of the touch display group not operating in the display mode and all of the touch areas of the touch display group not operating in the touch sensing mode;

wherein the plurality of touch display groups is configured to operate in the first operation mode one at a time according to a first predetermined sequence, and the plurality of touch display groups is configured to operate in the second operation mode one at a time according to a second predetermined sequence;

wherein the first predetermined sequence and the second predetermined sequence each comprise a plurality of time periods; and wherein when the first predetermined sequence and the second predetermined sequence control the same touch display group to operate in the first operation mode and the second operation mode during a same time period, the same touch display group operates in the touch sensing mode and temporarily stop receiving scan signals for stopping receiving the corresponding data signal, and the same touch display group operates in the display mode during a next time period of the first predetermined sequence, which is after the same period of the first predetermined sequence, and receives the scan signals and the corresponding data signals.

2. The embedded touch screen display panel driving mechanism as in claim 1, wherein:
the first substrate is an array substrate;
the second substrate is a color film substrate;
the liquid crystal layer is located between the first substrate and the second substrate;
the first substrate further comprises a first base layer, a pixel electrode layer, an insulating layer, and a common electrode layer;
the pixel electrode layer contains the plurality of pixel electrodes and is arranged on the first base layer;
the insulating layer is arranged on the pixel electrode layer;
the common electrode layer contains the plurality of common electrodes and is arranged on the insulating layer;
the common electrode layer is arranged between the liquid crystal layer and the insulating layer;
the second substrate further comprises a second base layer and a touch sensing electrode layer;
the touch sensing electrode layer contains the plurality of touch sensing electrodes and is arranged on the second base layer; and
the touch sensing electrode layer is located between the second base layer and the liquid crystal layer.

3. The embedded touch screen display panel driving mechanism as in claim 1, wherein:
the first common voltage is a direct current voltage; and
the second common voltage is an alternating current voltage.

4. The embedded touch screen display panel driving mechanism as in claim 1, wherein:
each pixel unit is composed of at least a corresponding pixel electrode and a corresponding transistor;
a gate electrode of the transistor is electrically coupled to a corresponding scan line to receive a scan signal;
a source electrode of the transistor is electrically coupled to a corresponding data line to receive a data signal;
a drain electrode of the transistor is electrically coupled to the pixel electrode to relay the data signal to the pixel electrode;
each common electrode is electrically coupled to a corresponding common voltage line to receive either the first common voltage or the second common voltage;
each touch sensing electrode is electrically coupled to a corresponding touch signal line to transmit touch signals according to the touch input applied on the touch areas;
each common electrode, upon receiving the first common voltage and according to the data signals received by the corresponding pixel electrodes, cooperatively induces a first electric field with the corresponding pixel electrodes of the corresponding pixel group to drive corresponding liquid crystals of the liquid crystal layer to rotate to display according to the data signals; and
each common electrode, upon receiving the second common voltage, cooperatively induces a second electric field with the corresponding touch areas corresponding in planar coordinate space to the corresponding pixel group to enable the corresponding touch areas to transmit the touch signals.

5. The embedded touch screen display panel driving mechanism as in claim 4, wherein:

the plurality of pixel units is arranged in a plurality of rows and a plurality of columns;

each row of pixel units constitutes one corresponding pixel group;

each common electrode and the corresponding row of pixel units extend along a first direction;

each touch sensing electrode corresponds in planar coordinate space to one corresponding column of pixel units; and each touch sensing electrode and the corresponding column of pixel units extend along a second direction perpendicular to the first direction.

6. The embedded touch screen display panel driving mechanism as in claim 5, wherein the embedded touch screen display panel further comprises:

a scan driver configured to transmit the scan signals along the corresponding scan lines, each scan line configured to transmit the scan signals to one corresponding row of pixel units;

a data driver configured to transmit the data signals along the corresponding data lines, each data line configured to transmit the data signals to one corresponding column of pixel units, and the data signals being transmitted to the rows of pixel units that are activated by the scan signals;

a touch sensing driver configured to receive the touch signals transmitted along the corresponding touch signal lines and determine a coordinate point of the touch signals;

a common voltage circuit configured to transmit the first and second common voltages along the corresponding common voltage lines; and a timing controller configured to control, according to a planar synchronization signal, the scan driver to transmit the scan signals, the data driver to transmit the data signals, the touch sensing driver to receive the touch signals, and the common voltage circuit to transmit either the first common voltage or the second common voltage.

7. The embedded touch screen display panel driving mechanism as in claim 6, wherein:

the first predetermined sequence and the second predetermined sequence are controlled according to the planar synchronization signal;

the timing controller transmits the data signals to the data driver to transmit to the pixel units;

the timing controller transmits, according to the planar synchronization signal, a gate control signal, a source control signal, a common voltage control signal, and a touch control signal to the scan driver, the data driver, the common voltage circuit, and the touch sensing driver, respectively;

the scan driver transmits the scan signals upon receiving the gate control signal;

the data driver transmits the data signals upon receiving the source control signal;

the common voltage circuit transmits the first common voltage or the second common voltage upon receiving and according to the common voltage control signal; and the touch sensing driver receives the touch signals upon receiving the touch control signal.

8. The embedded touch screen display panel driving mechanism as in claim 7, wherein:

the common voltage circuit comprises a common voltage supply driver and a control driver;

the common voltage supply driver is configured to output the first common voltage and the second common voltage; and the control driver is configured to control the common voltage supply driver to output the first common voltage and the second common voltage.

9. The embedded touch screen display panel driving mechanism as in claim 8, wherein a frequency of the first predetermined sequence is different from a frequency of the second predetermined sequence; the frequency is a number of the touch display groups in one time period.

10. The embedded touch screen display panel driving mechanism as in claim 9, wherein a direction of progression of the first predetermined sequence is the same as a direction of progression of the second predetermined sequence.

11. The embedded touch screen display panel driving mechanism as in claim 10, wherein:

the first predetermined sequence starts from a first touch display group, continues toward a last touch display group, and ends on the last touch display group;

the second predetermined sequence starts from a second touch display group, continues toward the last touch display group, and ends on the first touch display group;

the frequency of the second predetermined sequence is twice as fast as the frequency of the first predetermined sequence;

a time duration of each touch display group operating in the first operation mode is twice as long as a time duration of each touch display group operating in the second operation mode;

a time duration of each touch display group operating in the first operation mode is equal to a length of any one time period; and a time duration of each touch display group operating in the second operation mode is equal to a length of half of any one time period.

12. The embedded touch screen display panel driving mechanism as in claim 8, wherein a frequency of the first predetermined sequence is the same as a frequency of the second predetermined sequence; the frequency is a number of the touch display groups in one time period.

13. The embedded touch screen display panel driving mechanism as in claim 8, wherein a direction of progression of the first predetermined sequence is different from a direction of progression of the second predetermined sequence.

14. The embedded touch screen display panel driving mechanism as in claim 13, wherein:

the first predetermined sequence starts from a first touch display group, continues toward a last touch display group, and ends on the last touch display group;

the second predetermined sequence starts from the last touch display group, continues toward the first touch display group, and ends on the first touch display group;

a time duration of each touch display group operating in the first operation mode is the same as a time duration of each touch display group operating in the second operation mode; and a time duration of each touch display group operating in the first operation mode and the second operation mode is equal to a length of any one time period.

* * * * *